Figure 7:
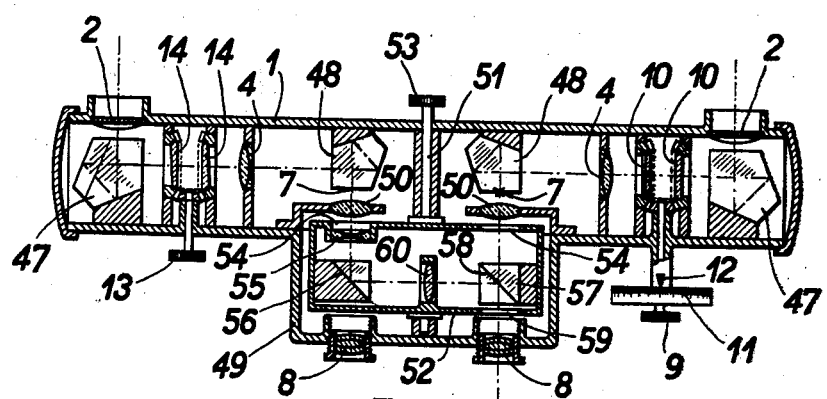

Jan. 25, 1938.   O. FREUND   2,106,632
SUPPLEMENTARY DEVICE FOR BINOCULAR RANGE FINDERS
Filed June 5, 1936   2 Sheets-Sheet 1
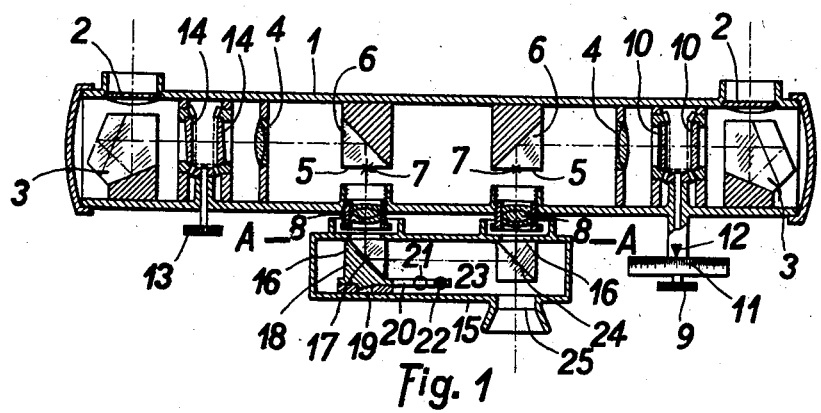
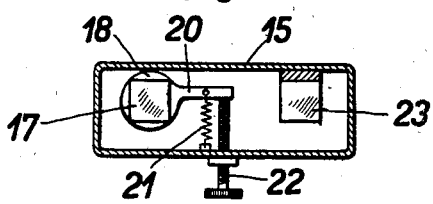
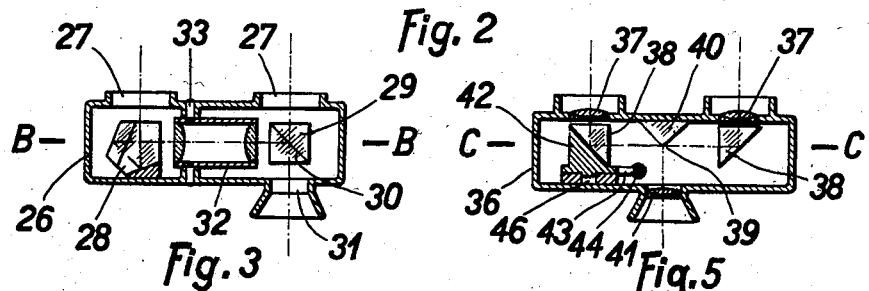
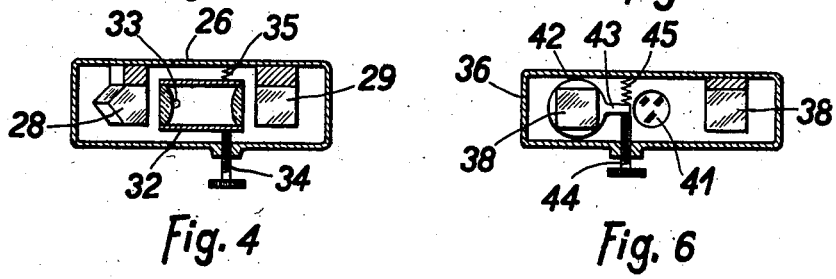
Inventor:

Jan. 25, 1938.　　　　　　O. FREUND　　　　　　2,106,632
SUPPLEMENTARY DEVICE FOR BINOCULAR RANGE FINDERS
Filed June 5, 1936　　　　2 Sheets-Sheet 2

Inventor:

Patented Jan. 25, 1938

UNITED STATES PATENT OFFICE 2,106,632

SUPPLEMENTARY DEVICE FOR BINOCULAR RANGE FINDERS

Otto Freund, Jena, Germany, assignor, by mesne assignments, to Bausch & Lomb Optical Company, Rochester, N. Y., a corporation of New York Application June 5, 1936, Serial No. 83,693
In Germany June 7, 1935

5 Claims. (Cl. 88—2.7)

I have filed an application in Germany, June 7, 1935 of which the following is a specification.

The invention has reference to binocular rangefinders of any kind, i. e. especially to rangefinders in which the stereoscopic image of a distant object is compared with stereoscopic measuring marks at constant or variable virtual distances, as well as to rangefinders for comparing instead of stereoscopic measuring marks two such space images of an object as are produced when different rangefinder bases are used, these images being separated from each other in the field of view by a line parallel to the rangefinder base or overlapping each other. In rangefinders of the said kind, the stereoscopic images are very often subject to errors of height, which may be due either to the component image of the object viewed in the one rangefinder eye-piece and the corresponding mark lying at a height different from that of the component image of the object viewed in the other rangefinder eye-piece and the mark corresponding to this other image, or to two heights of the component images of the object differing from those of the corresponding marks. This difference very often obtains also in the positions of the component images of the object relative to the component images overlapping them or relative to the separating lines. For the sake of simplicity, the following consideration refers only to rangefinders with measuring marks, but it is understood that, in principle, all other rangefinders for measuring methods of the said kind are concerned as well.

Whereas a difference of height of the two component images of the object does not entail special disadvantages when, in the fields of view of the two eye-pieces, the images of the object are at the same height as the corresponding marks, the measuring accuracy is impaired by even very slight differences of height between the images of the object and the corresponding marks, especially when long serial measurements are concerned, for which stereoscopic rangefinders are especially suitable. These errors of height can, it is true, be discarded by means of suitable devices with which the rangefinders are generally equipped, but difficulties arise not so much in neutralizing these errors as in finding them. As an observer can view in binocular rangefinders each of the two ocular fields of view by means of one eye only, he is compelled to compare these fields separately, one after the other, by shutting his one eye and opening the other and vice versa. A comparison of this kind produces incorrect results when the rangefinder is stationary, and the viewed object, nearly motionless, but effecting this comparison is entirely impossible when, for instance, the rangefinder is placed on a moving ship and when the object is a moving aircraft.

The invention concerns a supplementary device to be placed in the paths of imaging rays of the eye-pieces of a binocular rangefinder equipped with means for neutralizing errors of height. The supplementary device permits to find very reliably errors of height and their magnitudes, no matter where the rangefinder is mounted and what kind of object is concerned. The idea underlying this problem is to place between the observer's eyes and the image planes of the rangefinder, optical means which so combine the component images viewed by both eyes that one eye sees these images overlap each other or separated from each other by a separating line parallel to the rangefinder base. According to the invention, the problem is solved by providing the device with at least one reflecting system which deflects the pencil of imaging rays of one eye-piece, an optical system combining the pencils of imaging rays of the two eye-pieces, and a displaceable optical system varying the altitudinal direction of the one of the two pencils of imaging rays. The displaceable optical system may naturally be a reflecting system which simultaneously deflects the pencil of imaging rays of an eye-piece. The simultaneous perception of the images of both fields of view of the rangefinder by one eye permits the observer to find easily small errors of height and to compensate for differences of height of the component images of the object relative to the corresponding marks. This compensation of the errors of height in the rangefinder is effected by first making the mark images coincide completely as regards height, which is effected by means of the displaceable optical system, and by then providing this coincidence also with respect to the two component images of the object by operating the device for neutralizing errors of height. When rangefinders without marks are concerned, the separating lines parallel to the rangefinder base or one of the two pairs of component images of the object are treated in the same manner as the mark images referred to above, errors being removed by subsequent adjustment of the images or the remaining pair of component images of the object.

Figure 8:
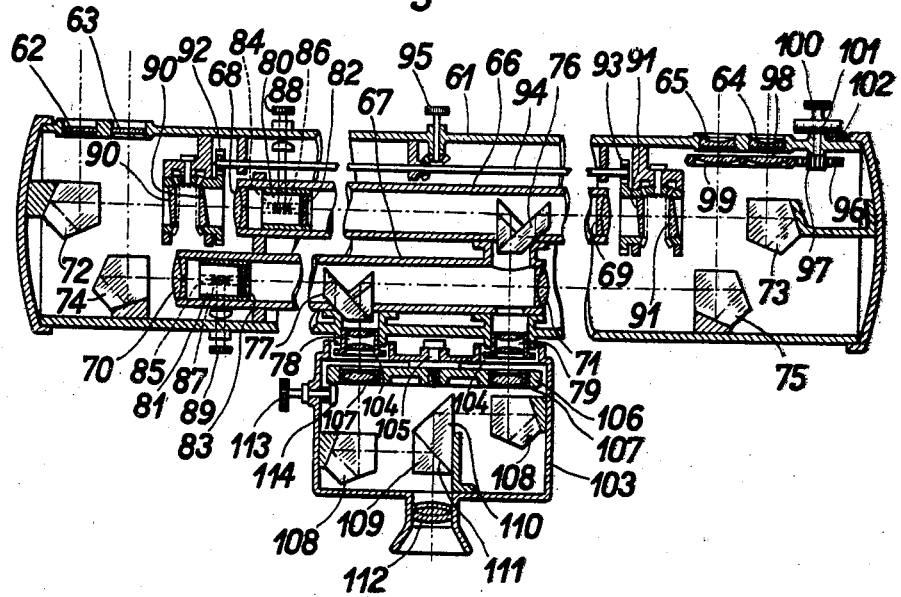

The accompanying drawings illustrate five constructional examples of the invention. Figure 1 shows in plan view section the first example in connection with a stereoscopic rangefinder. Figure 2 represents a section through line A—A in Figure 1. Figures 3 and 5 show the second and third examples, respectively, in plan view section. Figure 4 represents a section through line B—B in Figure 3, and Figure 6 represents a section through line C—C in Figure 5. Figures 7 and 8 show in plan view sections the fourth and fifth examples, respectively, in connection with a stereoscopic rangefinder.

The first constructional example (Figures 1 and 2) is used in connection with a stereoscopic rangefinder having a housing 1. At a distance apart which corresponds to the base length, the housing 1 has two windows 2 that are in front of pentagonal prisms 3 each of which has one roof-shaped reflecting surface. Pencils of light rays entering the windows 2 are deviated at right angles by the prisms 3 and directed to objectives 4, which gather the imaging rays on the ray exit surfaces 5 of triangle prisms 6 each of which is provided with a measuring mark 7 whose stereoscopic combination provides a stereoscopic mark at a definite virtual distance. The image planes of the rangefinder which are determined by the marks 7, are viewed by means of adjustable eye-pieces 8. The rangefinder has a measuring device which consists in the known manner of two wedge-shaped prisms 10 rotatable in opposite senses by means of a milled head 9, and of an indicating device consisting of an index 12 and a division 11 representing ranges. The rangefinder also contains a device for neutralizing errors of height which consists of two wedge-shaped prisms 14 rotatable in opposite senses by means of a milled head 13. The wedge-shaped prisms 10 are ineffective when their refracting edges are horizontal, in contradistinction whereto the wedge-shaped prisms 14 do not produce any effect when their refracting edges are vertical.

The supplementary device according to the first constructional example has a housing 15 provided with two windows 16 at a distance apart corresponding to that of the eye-pieces 8 of the rangefinder. Behind the left window 16, a triangle prism 17 is disposed in a mount 18 which is rotatable about a pin 19 and has an arm 20 connected to a tension spring 21 against the action of which the arm 20 can be rotated by means of a screw 22. Behind the right window 16 is a glass cube 23 and a viewing aperture 25 in the housing 15, the glass cube 23 having a diagonal surface 24 which is so silver-plated as to be half transparent.

When the rangefinder is used and a verification is to be made as to whether there are any errors of height, which may be due for instance to displacements of the optical part of the apparatus on account of vibration, the supplementary device is so placed behind the rangefinder that the windows 16 are in front of the eye-pieces 8. The paths of the imaging rays of the eye-pieces 8 are thus combined, and the object images produced by the rangefinder are seen by the observer looking into the viewing aperture as superposed on each other, deviations as to height of the object images as well as of the images of the marks 7 being readily recognizable by their differences of height. Now, the images of the marks 7 are given equal height by rotating the screw 22 accordingly and, subsequently thereto, an eventual difference of height of the object images is compensated for by rotating the wedge-shaped prisms 14 by means of the milled head 13. These manipulations remove errors of height of the kind in which the object images assume heights different from those of the marks 7 and, accordingly, the rangefinder can be used again without the supplementary device.

The device according to the second constructional example (Figures 3 and 4) has a housing 26 which is provided with two windows 27. Behind the left window 27 is disposed a pentagonal prism 28 having a roof-shaped reflecting surface, and behind the right window 27 is a glass cube 29, which combines the light rays, and a viewing aperture 31, the glass cube 29 being so silver-plated as to be half-transparent. Between the two prisms, an astronomical telescope 32 magnifying one time is so mounted in the housing 26 as to be rotatable, by means of a screw 34, against the pressure of a spring 35 about a horizontal axis 33 parallel to the entering imaging rays.

The device according to the second example is used in the same manner as that according to the first example, for instance in connection with a stereoscopic rangefinder of the kind represented in Figure 1. As, however, the astronomical telescope 32 in the path of the imaging rays completely reverses the images, there must be used, instead of the prism 17 of the first example, which has one reflecting surface, a prism 28 which, in addition to the effect produced by the prism 17, reverses the images completely. The change of direction of the imaging rays emanating from the eye-piece 8, which is necessary for the compensation of height of the two marks 7, is effected in the device according to the second example by rotating the telescope 32 about the horizontal axis 33 by means of a screw 34, against the pressure of the spring 35. In all other respects, the determination and the compensation of errors of height in the rangefinder are effected in the manner described with reference to the first example.

In the device according to the third constructional example (Figures 5 and 6), two objectives 37 are mounted in a housing 36 at such a distance apart as corresponds to the interocular distance of the eye-pieces 8 of the rangefinder. Behind each of the objectives 37 is disposed a triangular prism 38. The objectives 37 have the same focal length and, on account of the deflection of rays by means of the prism 38, the rear foci of these objectives coincide in an edge 39 of a right-angled isosceles triangle prism 40 mounted in the housing 36, the said edge 39 being the edge in which the two surfaces of prism 40 at right angles to each other intersect. This edge 39 lies in the front focal plane of an eye-piece 41 mounted in the housing 36. As in the first example, the left prism 38 is disposed in the housing 36 in a mount 42 having an arm 43 and rotatable against the pressure of a spring 45 about a pin 46.

Also the device according to this constructional example can be used with a rangefinder for instance according to Figure 1. When looking through the eye-piece 41, the person using the device sees an image field divided by a vertical separating line, namely the edge 39. By means of the eye-pieces 8 and the objectives 37, the object image produced by the left rangefinder objective and the left mark 7 are imaged in the left half of the said field of view, and the object image of the right objective 4 and the right mark 7 are imaged in the right half of the field of view. To facilitate the adjustment of the mark images at equal height in the field of view of the device, the marks 7 can be made to consist of a plurality of parts, one of these parts of each mark representing a horizontal line and the other parts being rangefinder marks of the usual kind at equal distances from the corresponding lines. When the line images in the two halves of the field of view are given the same height by means of the screw 41, the heights of the marks used for rangefinding are made to coincide with each other. The errors of height are neutralized completely by giving the object images of the two halves of the field of view the same height in the manner described hereinbefore.

The device according to the fourth constructional example (Figure 7) is a stationary supplementary device mounted into a rangefinder. This rangefinder conforms substantially to the rangefinder described with reference to the first example. The differences of the rangefinder shown in Figure 7 from the said other rangefinder consist in the following. The pentagonal prisms 47 behind the windows 2 have simple reflecting surfaces, and no image-reversing roof surface. There are no triangular prisms 6, but pentagonal prisms 48 on whose ray exit surfaces, which coincide with the focal planes of the objectives 4, are provided marks 7. The housing 1 has a flange part 49 the exterior wall of which contains the adjustable eye-pieces 8. Behind the prisms 48 are disposed objectives 50 of such focal lengths as to image the marks 7 in the front focal planes of the eye-pieces 8. About an axis at right angles to the rangefinder base, a housing 52 can be rotated in the part 49 by means of a milled head 53. The housing 52 has two windows 54 corresponding to the objectives 50. The one of the windows 54 is provided with a dispersing lens 55 of such a focal length that the front focus of the optical system consisting of this lens 55 and one objective 50 lies in the plane of the corresponding mark 7. Behind the lens 55 is disposed a triangle prism 56, and behind the free window 54, in the housing 52, is a glass cube 57 having a diagonal surface 58 which is so silver-plated as to be half-transparent. The housing 52 also has a window 59, which corresponds to the glass cube 57, and between the prism 56 and the cube 57 a convergent lens 60 is so disposed that, in consideration of the reflection on the surface 58, its rear focal plane coincides with the front focal plane of the eye-pieces 8.

When ranges are to be measured by means of the device, the housing 52 is so turned through the agency of the milled head 53 that the ray path from the objectives 50 to the eye-pieces 8 remains unobstructed. The objectives 50 produce in the front focal planes of the eye-pieces 8 intermediate images of the image planes of the rangefinder and the marks 7. As this intermediate imaging entails a complete image reversion, the prisms 47 and 48 are so constructed that the intermediate images are erect, as are the images on the ray exit surfaces 5 in the device according to the first example. Ranges are measured in the usual manner by combining stereoscopically the intermediate images of the object and by determining the range difference of the virtual position of this stereoscopic image by means of the measuring device 10, 11, 12 and the virtual position of the space image of the mark. For determining errors of height, the housing 52 is so rotated by means of the milled head 53 that the imaging rays of the eye-pieces 8 traverse the prisms 56 and 57. On account of the consequent simultaneous displacement of the divergent lens 55 into the left of these ray paths, the imaging rays emanating as convergent rays from the left objective 50 are made parallel and then combined by the convergent lens 60 to a converging pencil whose point of convergence coincides with the point of convergence of the converging pencil of imaging rays produced by the right objective 50. Accordingly, the two images of the viewed object as well as the images of the two marks 7 overlap each other in the focal plane of the right eye-piece, and undesired differences of height are noticed at once. Differences of height of the mark images are removed by rotating the milled head 53. When these images assume the same height, the differences of height of the images of the object are compensated for by operating the rotating wedge-shaped prisms 14. Subsequently to the ray paths from the objectives 50 to the eye-pieces 8 having been made free by rotating the head 53, the rangefinder can be used for measuring purposes in the known manner, without the results being impaired by errors of height.

The device according to the fifth constructional example (Figure 8) is used together with a rangefinder that has no measuring marks and with which measurements are effected by giving the same virtual distance to two such stereoscopic images of an object as are produced by means of two rangefinder systems of different bases. The said rangefinder has a housing 61 with four apertures for entering rays. The two apertures in the left end of the base are covered by two plano-parallel glass plates 62, 63, and the two apertures in the right end of the base are covered by two divergent lenses 64, 65 which are equal to each other. The housing 61 contains two tubes 66 and 67 having in their ends telescope objectives 68, 69 and 70, 71, respectively. Four pentagonal prisms 72, 73, 74 and 75, which are provided behind the ray entrance apertures, deflect the entering pencils of imaging rays at right angles into the said objectives. The ray pencils are combined by these objectives to object images and so deflected by means of two ray combining systems 76 and 77, each of which consists of a trapeziform and an image-reversing roof-surfaced triangle prism, that they are in pairs in the front focal plane of two adjustable eye-pieces 78, 79 in the housing 61. The light exit apertures of the trapeziform and the triangle prisms cover the upper and the lower halves, respectively, of the ocular fields of view. To each of the interior tubes 66, 67 is coordinated a device for displacing the one of the two imaging ray pencils altitudinally. These devices consist of boxes 80, 81 which are displaceably mounted in the interior tubes 66, 67 and in which wedge-shaped prisms 82, 83 are so mounted that their refracting edges are horizontal. The boxes 80, 81 are provided with racks 84, 85 in mesh with toothed wheels 86, 87 connected to milled heads 88, 89 outside the housing 61. In front of the ends of the interior tube 66 which face the object, pairs of wedge-shaped prisms 90, 91 are so disposed in the housing 61 as to be rotatable in opposite senses. The refracting edges of the wedges 90, 91 are vertical when the wedge-shaped prisms do not produce any effect. The pairs of wedge-shaped prisms 90, 91 are operated by toothed wheels 92, 93 connected to a shaft 94 which is disposed in the housing 61 and rotatable by means of a milled head 95, the two exterior wedge-shaped prisms being rotatable in a sense reverse to that of the two interior wedge-shaped prisms. The range-finding device of the apparatus consists of two convergent lenses 98, 99 displaceable in the direction of the rangefinder base by means of a rack 96 and a toothed wheel 97. These lenses 98, 99 are disposed behind the divergent lenses 64, 65 and have such focal lengths that one each of the convergent and one each of the divergent lenses produce the effect of a plano-parallel plate when the optical axes coincide, in contradistinction whereto displacements of the lenses entail lateral deviations of the pencil of imaging rays. The toothed wheel 97 is coupled to a milled head 100 and provided with a division 101 representing ranges and coordinated to an index 102.

The supplementary device according to the fifth example has a housing 103 with two ray entrance apertures 104 at a distance apart which corresponds to the interocular distance of the eye-pieces 78. Between the apertures 104 is a rotatable bolt 105 for a lens holder 106. In this lens holder, two objectives 107 are so mounted as to lie behind the apertures 104. Small rotations of the bolt 105 entail such displacements of the objectives 107 at right angles to their optical axes that the incident pencil of rays is deviated altitudinally. Behind the objectives 107 are disposed pentagonal prisms 108 for deflecting the ray pencils at right angles into a ray converging system which consists of two triangle prisms 109 and 110 and whose cemented surface 111 is so silver-plated as to be half-transparent. The rear focal planes of the objectives 107 coincide with the front focal plane of an eye-piece 112. The lens holder 106 is rotated by means of a milled head 113 and a friction wheel 114.

When the device is to be used, the housing 103 is given the position behind the eye-pieces of the rangefinder, as described with reference to the first example. As is well known, this rangefinder produces two stereoscopic images of an object which are so disposed as to be inverted relatively to each other and separated by a horizontal separating line. The separating lines are provided by the lower edges of the light exit apertures of the trapeziform prisms of the systems 76 and 77, and the inversion of the images is effected by the roof-shaped surfaces of the triangle prisms of the said systems. The two object images produced by the objectives 68 and 71 furnish the erect, and the two object images produced by the objectives 69 and 70 furnish the inverse stereoscopic image of the object. The ranges are measured by making the displaceable lenses 98, 99 produce a coincidence of the two stereoscopic images. The supplementary device acts as a double telescope which is disposed behind the eye-pieces 78, 79 of the rangefinder and in whose field of view the two erect as well as the two inverted object images of the rangefinder overlap each other. By turning the milled head 113, the lens holder 106 is rotated through small angles until the images of the two separating lines coincide in the field of view of the eye-piece 112. Subsequently thereto, the errors of height of the rangefinder, which are perceived as differences of height of object images overlapping each other, viz, the unequal distances of the object images from the separating line, are removed by rotating the milled heads 88 and 89 and thus displacing the wedge-shaped prisms 82 and 83 until these differences of height have disappeared in the erect as well as in the inverse object images. Differences of height can now exist only between the object images of the upper and the lower half of the image field. These differences of the object images from the separating line are dealt with by rotating the milled head 95, which means that the images of the two halves of the image field are displaced relatively to the separating line in the reverse direction of height, since the pairs of wedge-shaped prisms 90 and 91, which are operated at the same time, influence in different senses the images visible in the right eye-piece 79. As soon as this adjustment is effected, the rangefinder is devoid of any errors of height detrimental to observations and can be used for further measurements without the supplementary device.

I claim:

1. A supplementary device for a binocular rangefinder having a device for removing errors of height, the said supplementary device comprising a housing, this housing having two apertures in one side and a third aperture in the opposite side, the distance apart of the two first said apertures corresponding to the interocular distance of the two eye-pieces of the said rangefinder, optical means for lateral deflection of at least the light rays entering through the one of the two first said apertures, optical means for combining the two pencils of light rays entering through the two first said apertures, optical means for altitudinal deflection of at least the light rays entering through the one of the two first said apertures, and mechanical means for displacing the last said optical means, the said optical means being disposed in the said housing.

2. In a supplementary device according to claim 1, said optical means comprising a reflecting system for deflecting at least the light rays entering through the one of the two first said apertures, the said reflecting system being disposed in the said housing and rotatable about an axis parallel to the axes of the pencils of light rays entering through the two first said apertures.

3. In a supplementary device according to claim 1, said optical means comprising a telescope disposed in the path of the light rays entering the said housing through the one of the two first said apertures, the said telescope magnifying one time, this telescope being disposed in the said housing and rotatable about an axis parallel to the axes of the pencils of light rays entering through the two first said apertures.

4. In a supplementary device according to claim 1, said optical means comprising a telescope system disposed in the said housing, this telescope system comprising two objectives and a common eye-piece, the said objectives being co-ordinated to the two first said apertures in the housing, the said eye-piece being coordinated to the said third aperture in the housing, at least one of the said objectives in the housing being rotatable about an axis parallel to the axis of the first said rotatable objective.

5. In a binocular rangefinder having a device for removing errors of height, a supplementary device mounted in front of the two eye-pieces of the said rangefinder, the said supplementary device comprising a housing, this housing having two apertures in one side and a third aperture in the opposite side, the distance apart of the two first said apertures corresponding to the interocular distance of the two eye-pieces of the said rangefinder, optical means for lateral deflection of at least the light rays entering through the one of the two first said apertures, optical means for combining the two pencils of light rays entering through the two first said apertures, optical means for altitudinal deflection of at least the light rays entering through the one of the two first said apertures, and mechanical means for displacing the last said optical means, the said optical means being disposed in the said housing.

OTTO FREUND.